(12) United States Patent
Graßl et al.

(10) Patent No.: US 12,136,895 B2
(45) Date of Patent: Nov. 5, 2024

(54) METHOD FOR OPERATING AN ELECTRICAL CIRCUIT ARRANGEMENT, AN ELECTRICAL CIRCUIT, AND A MOTOR VEHICLE

(71) Applicant: AUDI AG, Ingolstadt (DE)

(72) Inventors: Tobias Graßl, Denkendorf (DE); Mathias Korn, Regensburg (DE)

(73) Assignee: AUDI AG, Ingolstadt (DE)

( * ) Notice: Subject to any disclaimer, the term of this patent is extended or adjusted under 35 U.S.C. 154(b) by 22 days.

(21) Appl. No.: 18/053,729

(22) Filed: Nov. 8, 2022

(65) Prior Publication Data

US 2023/0146756 A1    May 11, 2023

(30) Foreign Application Priority Data

Nov. 9, 2021 (DE) .......................... 102021129144.5

(51) Int. Cl.
*H02P 29/032* (2016.01)
*H02P 27/06* (2006.01)

(52) U.S. Cl.
CPC ............ *H02P 29/032* (2016.02); *H02P 27/06* (2013.01)

(58) Field of Classification Search
CPC .............................. H02P 29/032; H02P 27/06
See application file for complete search history.

(56) References Cited

U.S. PATENT DOCUMENTS

| 2019/0296670 A1* | 9/2019 | Omata | .................... H02P 21/22 |
| 2021/0288604 A1* | 9/2021 | Kondo | .................... B60L 3/003 |

FOREIGN PATENT DOCUMENTS

| DE | 102010039190 A1 | 2/2012 |
| DE | 102011086079 A1 | 5/2013 |
| DE | 102013213044 A1 | 1/2015 |
| DE | 102013226560 A1 | 6/2015 |
| DE | 102014209887 A1 | 11/2015 |
| DE | 102014222256 A1 | 5/2016 |

* cited by examiner

*Primary Examiner* — Zoheb S Imtiaz
(74) *Attorney, Agent, or Firm* — Seed IP Law Group LLP

(57) ABSTRACT

A method for operating an electrical circuit arrangement comprising an electrical circuit and an electrical machine, wherein when at least one triggering criterion is fulfilled the electrical machine is switched via the electrical circuit to a freewheeling, after which a time duration is determined in dependence on at least one measurement value describing a change in the stator current in the electrical machine, and the electrical machine is operated in the freewheeling for this duration and then it is switched via the electrical circuit to an active short circuiting.

11 Claims, 2 Drawing Sheets

METHOD FOR OPERATING AN ELECTRICAL CIRCUIT ARRANGEMENT, AN ELECTRICAL CIRCUIT, AND A MOTOR VEHICLE

BACKGROUND

Technical Field

Embodiments of the invention relate to a method for operating an electrical circuit arrangement comprising an electrical circuit and an electrical machine, wherein when at least one triggering criterion is fulfilled the electrical machine is switched via the electrical circuit to a freewheeling. Furthermore, embodiments of the invention relate to an electrical circuit and a motor vehicle.

Description of the Related Art

Electrical machines may require an immediate switching of the electrical machine while still in operation upon occurrence of a fault in the electrical machine or in a device encompassing the electrical machine. Such a fault condition may be present, for example, when a load shedding occurs or when the device encompassing the electrical machine, such as a motor vehicle encompassing the electrical machine as a traction motor, determines that an error condition is present, for example due to an accident or the like. For such a switch-off process, the electrical machine must be converted to a safe condition, in addition to having further electrical components. Various steps may be carried out for this, which may result in particular in reducing the voltage supply of the electrical machine, the avoidance of sudden torque changes of the electrical machine, and/or the avoidance of abrupt braking maneuvers.

In particular, an active short circuiting or a freewheeling of the electrical machine may be activated to achieve the safe condition. Which of these means is suitable will depend on the type of the electrical machine, i.e., for example on whether it is an asynchronous machine or a synchronous machine. Various methods are known in the prior art for switching an electrical machine to a freewheeling or to an active short circuiting.

In DE 10 2014 209 887 A1 a method is described for switching an inverter of an electrical drive unit of a motor vehicle. The inverter here can produce a freewheeling operating mode, a short circuiting operating mode, and a clocked operating mode for operating the electrical machine. The switching between the operating modes occurs in dependence on an ascertained voltage value and/or an ascertained current value for the present operating mode, and an adaptation process is carried out in dependence on the ascertained voltage value and/or the ascertained current value to adapt the current and/or voltage in the electrical machine for the target operating mode.

In the transition from the freewheeling operating mode to the short circuiting operating mode in this case, at first a current regulator of the inverter is operated for a brief time with a current setpoint value of zero, and during this time a voltage value and/or a current value is ascertained for the present operating mode. Within this time, the voltage on the electrical machine can be lowered in stages to zero, and then the clocking of the inverter is ended with a switching of the inverter to the short circuiting operating mode. In this way, voltage differences or current differences between the present operating mode and the target operating mode can be balanced out and transient current surges or voltage surges can be reduced or prevented.

DE 10 2013 226 560 A1 discloses a method for an improved switching from a freewheeling operation to an active short circuiting of an electrical machine. In this case, the switching from the freewheeling to the active electrical short circuiting is delayed until an electrical voltage at the terminals of the electrical machine has a predetermined value. In this way, the switching can occur in dependence on a rotor position as determined by the particular voltage.

In DE 10 2010 039 190 A1, a method is described for operating an electrical machine actuated by an inverter in a motor vehicle having an automatically operated transmission. In a generator operation of the electrical machine, in which the electrical machine feeds energy to an energy accumulator, a quantity describing the state of charge of the energy accumulator is detected in event of a fault and this is compared to a predetermined lower threshold value. If it falls below this threshold value, the electrical machine is switched by the inverter to a freewheeling mode and a gear ratio is adjusted in the automatic transmission which is higher than the present gear ratio. In this way, a change in the speed of rotation of the electrical machine can be accomplished, which can influence the charge power being fed to the energy accumulator.

BRIEF SUMMARY

Some embodiments provide an improved method for operating an electrical circuit arrangement having an electrical machine, in particular making possible a better switching to a safe condition of the electrical machine.

In some embodiments, in a method of the kind mentioned above, a time duration is determined in dependence on at least one measurement value describing a change in the stator current in the electrical machine, and the electrical machine is operated in the freewheeling for this duration and then it is switched via the electrical circuit to an active short circuiting. This makes it possible to switch the electrical machine or the circuit arrangement to a safe condition depending on the type-dependent requirements of the electrical machine, without the type of the electrical machine having to be incorporated in a controller designed to carry out the method. Taking account of the stator current change after the switching of the electrical machine to a freewheeling makes it possible to infer the type of the electrical machine or the optimal response to achieve the safe condition. Moreover, by determining the time duration for which the freewheeling of the electrical machine is maintained in dependence on the stator current change, there is no need for a parameterization of the electrical machine in the electrical circuit or a controller of the electrical circuit. The method which is carried out upon fulfillment of the triggering criterion can thus be implemented basically identical for different types of electrical machines, only taking account of the ascertained time duration as a variable. This reduces the complexity of the method and simplifies its implementation. Moreover, it becomes possible to switch a connected electrical machine always to an active short circuiting regardless of its type, the electrical machine being completely short circuited in this condition.

The at least one triggering criterion which must be fulfilled in order for the electrical machine to be switched at first to a freewheeling and then to the active short circuiting after the time duration ascertained in dependence on the stator current change is fulfilled in particular when a particular situation occurs necessitating the switching of the electrical machine to a safe condition, or when information describing such a situation is present in a controller adapted to carry out the method. Various kinds of triggering criteria or information are basically conceivable, which may also be oriented in particular to the nature of the device in which the electrical circuit arrangement is employed. Thus, a switching of the electrical machine to a safe condition can be activated via the at least one triggering criterion both in event of a fault condition in the electrical circuit arrangement and in event of a fault condition in a device encompassing the electrical circuit arrangement.

A freewheeling of the electrical machine describes in this context a condition in which energy can be fed from the electrical machine to the electrical circuit or to another component of the electrical circuit arrangement, in particular an energy accumulator connected to the electrical circuit. By an active short circuiting is meant a condition in which the electrical machine, especially a multiphase stator winding of the electrical machine, is short circuited.

In some embodiments, a larger time duration is determined for a rather large change in stator current, associated with a configuration of the electrical machine as an asynchronous machine, than for a rather small change in the stator current, associated with a configuration of the electrical machine as a synchronous machine. The values for a rather large stator current change and a rather small stator current change can be incorporated in a controller designed to carry out the method, for example with the aid of limit values for the stator current change and/or with the aid of one or more match-up rules which match up each time an ascertained stator current change with a time duration. Consequently, a rather large stator current change can be a stator current change lying above a limit value and the rather small stator current change can be a stator current change lying below the limit value or below another limit value. For example, the rather small stator current change in this case can be matched up with an electrical machine designed as an outside excited synchronous machine or as a permanently excited synchronous machine.

In some embodiments, a time duration between 100 ms and 1 s, especially between 250 ms and 750 ms, is determined for the change in stator current associated with an asynchronous machine and/or a time duration between 50 µs and 250 µs, especially between 75 µs and 125 µs, is determined for the change in stator current associated with a synchronous machine.

Upon fulfillment of at least one triggering criterion, the electrical machine is switched via the electrical circuit at first to a freewheeling. In an asynchronous machine, the stator current and thus an induced voltage dissipates very quickly, for example, in the range of around 100 µs. If this is the case, the freewheeling must be maintained longer, especially until the current in the rotor has dissipated completely or at least partially. On account of the rapid dissipation of the stator current, a large stator current change occurs in this case. The complete or at least partial dissipation of the rotor current may occur in a time range of a few 100 ms, so that the electrical machine can be further operated for this period in the freewheeling condition. For this, a time duration between 100 ms and 1 s, especially between 250 ms and 750 ms, can be determined for continuing to operate the electrical machine in the freewheeling condition. After this time duration elapses, the electrical machine can be switched to an active short circuiting and remain here. The active short circuiting represents here a particularly long-lasting safe condition of the electrical machine.

In event of a smaller stator current change, the current in the stator dissipates more slowly, which indicates in particular that a permanently excited synchronous machine or an outside excited synchronous machine is at hand. These machine types basically allow a direct transition to an active short circuiting, so that the energy fed back in the freewheeling operation can be kept as small as possible. The at least brief maintaining of the freewheeling before switching to the active short circuiting may prove beneficial in a synchronous machine, especially for the permanent magnets, in order to reduce the forces acting on the magnets during the shutdown process of the electrical machine. However, in this case a shorter time duration is sufficient, so that the determination of a time duration between 50 µs and 250 µs, especially between 50 µs and 125 µs, is sufficient for the rather small stator current change. After this, a switching to the active short circuiting can likewise occur, so that the electrical machine is in a particularly long-lasting safe condition.

In some embodiments, a change in stator current is considered to be a rather large change in stator current when the stator current has fallen within 100 µs to at least 50% of the value of the stator current upon switching of the electrical machine to the freewheeling, and a change in stator current is considered to be a rather small change in stator current when the stator current has fallen within 100 µs to at most 80% of the value of the stator current upon switching of the electrical machine to the freewheeling. Accordingly, a large change in stator current is present when the stator current has fallen within 100 µs to 50% or less of the stator current at the beginning of the switching of the electrical machine to the freewheeling. Accordingly, a rather small change in stator current may be present when the stator current still amounts to 80% or more of the value of the stator current upon switching of the electrical machine to the freewheeling within 100 µs.

The stator current change can be done for example with the aid of at least one measurement value of the stator current at the time of the switching of the electrical machine to the freewheeling and by taking into account at least one measurement value detected in the freewheeling condition. An extrapolation of multiple measurement values ascertained after the switching to the freewheeling, each time describing the stator current, can also make possible an ascertaining of the stator current change. The use of further methods for determining the stator current change is likewise possible.

In some embodiments, multiple measurement values of at least one stator current sensor, especially at least one phase current sensor, are used as the measurement values describing the change in stator current. This has the advantage that sensors which are present any way for the operation of the electrical machine can be used. For example, such sensors can be used in a method for engine regulation, so that present measurement values which are generally present during the operation of the electrical machine are also present at the time of fulfillment of the triggering criterion and thus at the time of switching of the electrical machine to a freewheeling. Furthermore, these measurement values can also be determined after the switching to the freewheeling, so that the determination of the stator current changes is easily possible.

In some embodiments, an inverter, especially a multiphase pulse inverter, is used as the electrical circuit. This makes possible an operation of the electrical machine in a motor mode as well thanks to the electrical circuit arrangement. Basically, however, it is also possible to implement the method with a different kind of electrical circuit which makes it possible to place the electrical machine in the freewheeling and the active short circuiting state.

For example, in a three-phase pulse inverter connected to a three-phase electrical machine, the switching to the freewheeling can occur by opening all circuit elements of the inverter, so that a feedback of electric energy is possible across the freewheeling diodes switched in parallel with the circuit elements. During an active short circuiting, each time the three upper circuit elements or the three lower circuit elements of the circuit elements hooked up into three half-bridges can be switched to become conducting and the respective other ones can be blocked, so that a short circuiting of the electrical machine or its stator winding is achieved.

In some embodiments, the triggering criterion is fulfilled when a fault is present in the electrical circuit arrangement and/or in a device encompassing the electrical circuit arrangement. The device can be, in particular, a motor vehicle, in which the electrical machine is used as an electrical traction motor. The electrical traction motor in its regular operation can be in a motor mode, in which the motor vehicle is driven via the motor, or in a generator mode, in which for example a traction energy accumulator of the motor vehicle connected to the electrical circuit is charged.

In some embodiments, a load shedding of the electrical machine and/or a detected collision of a device designed as a motor vehicle is used as the fault. The checking of whether a triggering criterion is fulfilled can be done for example by a controller designed to carry out the method, in which case one or more pieces of information relayed to the controller can be used as the basis. For example, a triggering criterion can be fulfilled when accident information describing an accident of the motor vehicle has been relayed to the controller. In addition or alternatively to accident information, other information describing a different fault can also be used, likewise resulting in the fulfillment of at least one triggering criterion and thus placing the electrical machine in a safe condition.

In some embodiments, an electrical circuit comprises a controller, the electrical circuit being connected or able to be connected to an electrical machine and the controller being designed to carry out a method as described herein.

In some embodiments, a motor vehicle comprises an electrical circuit arrangement having an electrical machine and an electrical circuit as described herein, the electrical circuit being connected to the electrical machine.

All of the benefits and configurations described above in regard to methods hold accordingly for electrical circuits and electrical motor vehicles and vice versa.

BRIEF DESCRIPTION OF THE SEVERAL VIEWS OF THE DRAWINGS

Further benefits and details will emerge from the embodiments described below and also with the aid of the drawings.

DETAILED DESCRIPTION

Figure 1:
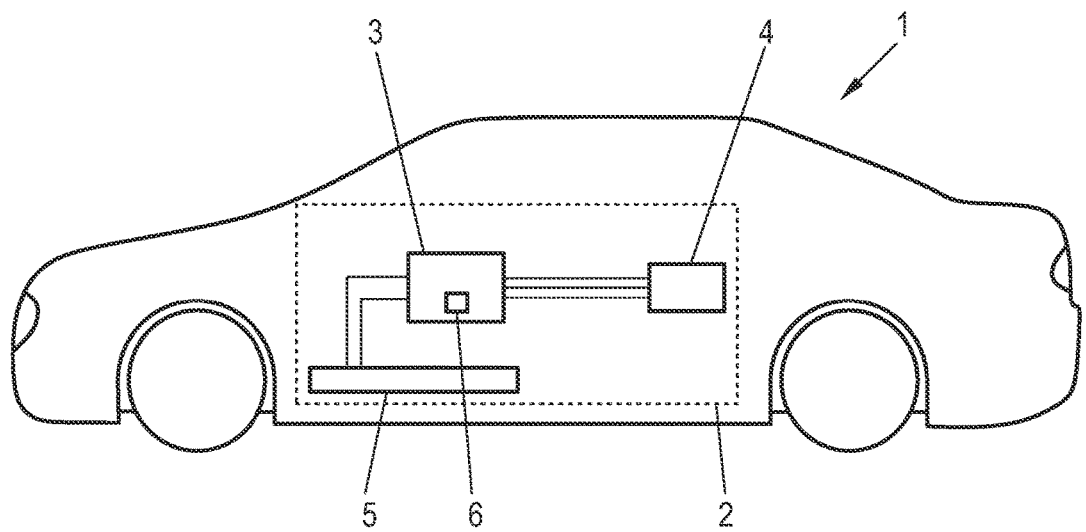
FIG. 1 shows an embodiment of an electrical motor vehicle.

FIG. 1 shows an embodiment of a motor vehicle 1. The motor vehicle 1 comprises an electrical circuit arrangement 2, comprising an electrical circuit 3 and an electrical machine 4. Furthermore, the electrical circuit arrangement 2 comprises an energy accumulator 5, which is connected across the electrical circuit 3 to the electrical machine 4.

The electrical machine 4 forms a traction motor of the motor vehicle 1 and is operated for this purpose across the energy accumulator 5, designed as a traction battery. For this, the electrical circuit 3 is hooked up between the energy accumulator 5 and the electrical machine 4 and is designed as an inverter, especially a three-phase pulse inverter. Thus, thanks to the electrical circuit 3, a direct current taken from the energy accumulator 5 can be converted into a three-phase alternating current to operate the electrical machine 4. In a generator operation of the electrical machine 4, i.e., a recuperation mode of the motor vehicle 1, an alternating current generated by the electrical machine 4 is converted accordingly to a direct current for the charging of the energy accumulator 5.

The electrical circuit arrangement 3 furthermore comprises a controller 6, which is designed to carry out a method for operating the electrical circuit arrangement 2, in order to switch the electrical machine 4 to a safe condition upon occurrence of a fault. The switching of the electrical machine 4 occurs in this case via the other elements of the electrical circuit 3.

Figure 2:
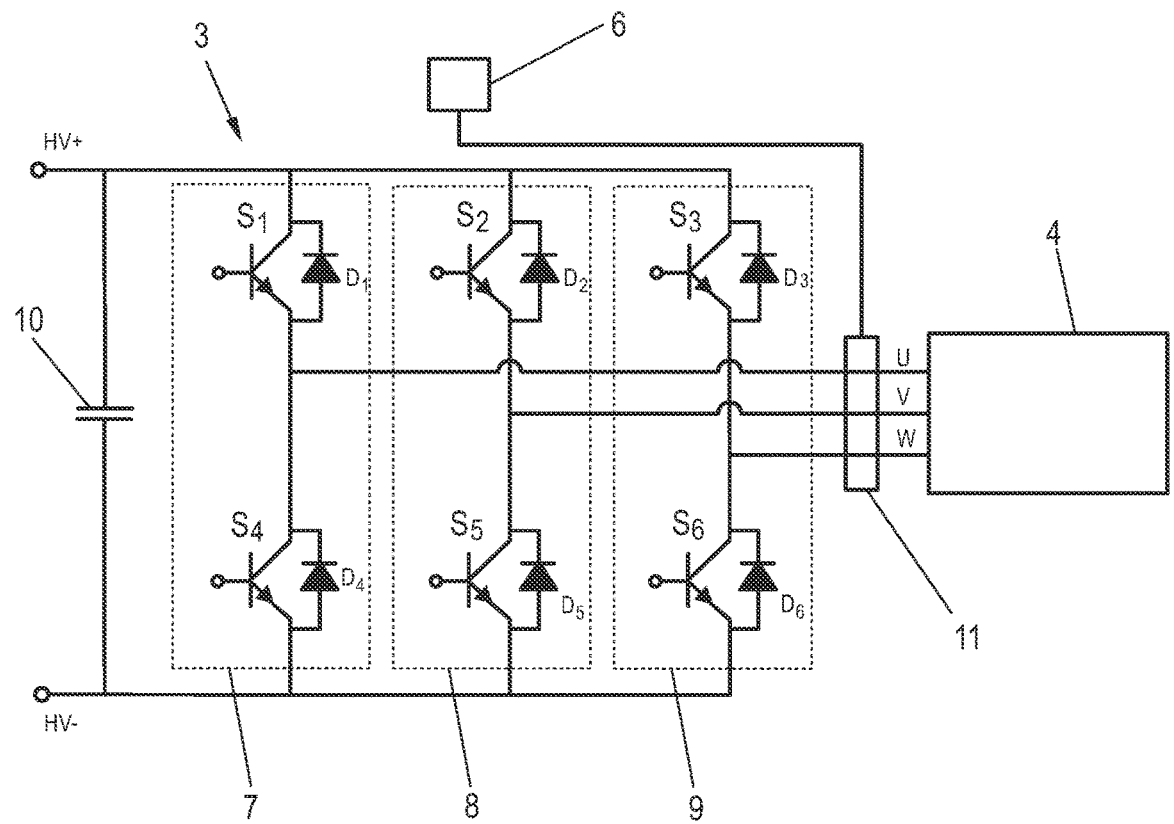
FIG. 2 shows an electrical circuit arrangement with an embodiment of an electrical circuit.

FIG. 2 shows an embodiment of the electrical circuit 3. The electrical circuit 3 is designed as a three-phase pulse inverter and comprises six circuit elements $S_1$-$S_6$. Each time a freewheeling diode $D_1$-$D_6$ is hooked up in parallel with the circuit elements $S_1$-$S_6$.

The circuit elements $S_1$-$S_6$ form three half-bridges 7, 8, 9, the first half-bridge 7 being formed by the circuit elements $S_1$ and $S_4$, the second half-bridge 8 by the circuit elements $S_2$ and $S_5$ and the third half-bridge 9 by the circuit elements $S_3$ and $S_6$. The controller 6 is connected to the control terminals of the circuit elements $S_1$-$S_6$, designed for example as transistors, while the corresponding connections are not shown for reasons of clarity.

The electrical circuit 3 can furthermore include an intermediate circuit capacitor 10 and further circuit elements. The bridge points of the half-bridges 7, 8, 9 are connected to the stator winding of the electrical machine 4, configured as a three-phase electrical machine. The terminals of the electrical circuit 3, designated as HV+ and HV−, are connected to the energy accumulator 5. The phases U, V, W are matched up with a stator current sensor 10 as the measurement means by which measurement values describing a stator current or a stator current change in the electrical machine 4 can be determined. The measurement device 11 is connected to the controller 6 and transmits the ascertained measurement values to the controller 6. The controller 6 can be adapted in a regular operation of the electrical machine 4 for operating it in a motor and/or generator mode corresponding to the requirements of the driving operation of the motor vehicle 1.

The controller 6 is furthermore adapted to convert the electrical machine 4 to a safe condition in a fault. For this, the controller 6 can evaluate one or more triggering criteria, the presence of a fault in the electrical circuit arrangement 2 and/or in the motor vehicle 1 being described each time by the fulfillment of one of the triggering criteria. The fulfilling of the triggering criteria can be checked by the controller 6, especially in continuous manner. For this, the controller 6 can evaluate one or more further pieces of information, which are relayed to the controller 6 for example via a communication link (not shown) of the motor vehicle 1, such as a data bus, by which multiple controllers of the motor vehicle 1 communicate with each other.

Figure 3:
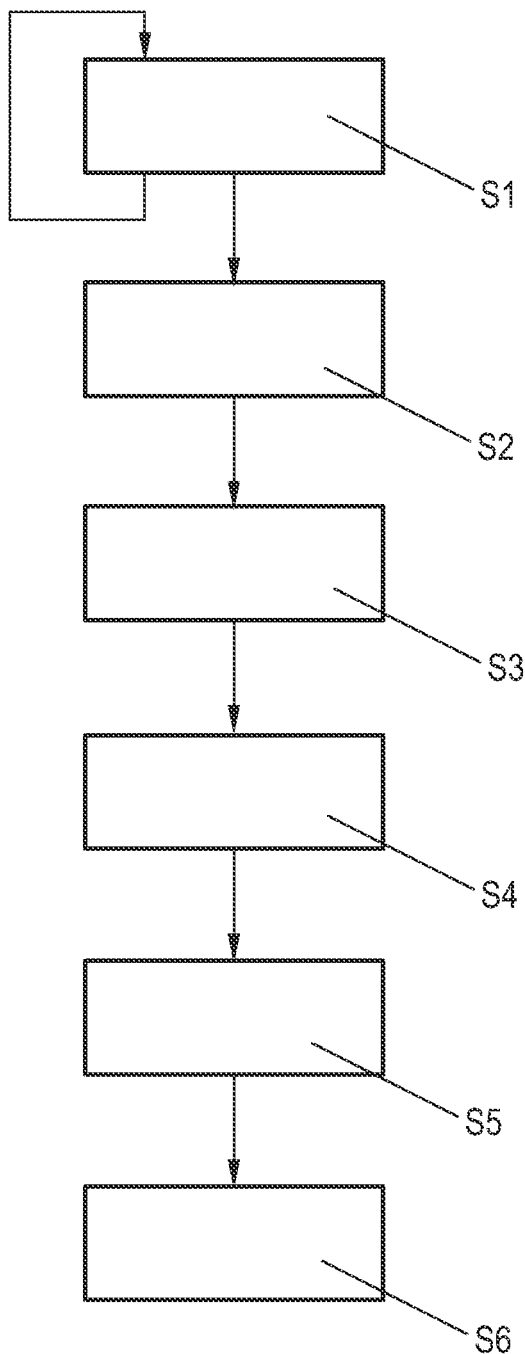
FIG. 3 shows a block diagram of an embodiment of a method.

FIG. 3 describes a method for operating the electrical circuit arrangement 2, making it possible to place the electrical machine 4 in a safe condition. This can be done independently of the type of the electrical machine 4.

In step S1, the at least one triggering criterion is checked continuously to see whether it is fulfilled. Upon fulfillment of the triggering criterion, in a next step S2 the electrical machine 4 is switched by the electrical circuit 3 to a freewheeling. For this, the six circuit elements $S_1$-$S_6$ are each opened, so that electric energy can be fed back across the electrical machine 4 to the energy accumulator 5. For this, the current generated by the electrical machine 4 can flow across the freewheeling diodes $D_1$-$D_6$ of the electrical circuit 3.

During the switching of the electrical machine 4 to the freewheeling or immediately thereafter, in step S3, at least one stator current change is determined in the electrical machine 4. For this, in particular, the measurement values of the sensor device 11, which describe the phase currents of the electrical machine 4, can be ascertained. In addition or alternatively, measurement values of the stator currents, which are stored for example in the controller 6, can also be used, so that the stator current at the time of fulfillment of the triggering criterion and/or at the time of the switching of the electrical machine 4 to the freewheeling can also be used to ascertain the extent of a stator current change in the electrical machine 4 after the switching to the freewheeling.

The magnitude of the stator current change basically makes it possible to infer the type of the electrical machine 4, without this having to be registered in the controller 6. A rather large stator current change for example can be associated with a design of the electrical machine 4 as an asynchronous machine, while a rather small stator current change can be associated with a design of the electrical machine as a synchronous machine, such as an outside excited or permanently excited synchronous machine. In order to determine whether a particular stator current change is a rather large or a rather small stator current change, it is possible to consider for example limit values which are stored in the controller 6. A comparison of the stator current change rate or a comparison with the stator current before or directly upon switching of the electrical machine 4 to the freewheeling is also possible.

In particular, a stator current change can be interpreted as a rather large stator current change when the stator current has fallen within 100 µs to at least 50% of the value of the stator current upon switching of the electrical machine 4 to the freewheeling. Accordingly, a stator current change can be viewed as being a rather small stator current change when the stator current has fallen within 100 µs to at most 80% of the value of the stator current upon switching of the electrical machine 4 to the freewheeling. In addition or alternatively, the stator current change can also be ascertained by a change rate of the stator current, especially while the electrical machine 4 is in the freewheeling state, while the absolute stator current change can be ascertained for example by the controller 6 using an extrapolation.

After ascertaining the stator current change, in step S4 a time duration is determined in dependence on the ascertained stator current change. In the case of a rather large stator current change, associated with an asynchronous machine, a time duration between 100 ms and 1 s, especially between 250 ms and 750 ms, can be determined. In the case of a rather small stator current change, associated for example with a synchronous machine, a time duration between 50 µs and 250 µs, especially between 75 µs and 125 µs, can be determined.

In step S5, finally, one waits for the ascertained time duration to elapse and the electrical machine 4 is left for this time in the freewheeling state. After this, in step S6, a switching of the electrical machine to an active short circuiting is done. The duration of step S5 is oriented to the length of the ascertained time duration and thus to the stator current change and consequently indirectly to the type or model of the electrical machine 4.

For the switching of the electrical machine 4 to the active short circuiting, the circuit elements $S_1$-$S_3$ can be opened and the circuit elements $S_4$-$S_6$ closed, for example. A closing of the circuit elements $S_1$-$S_3$ and an opening of the circuit elements $S_4$-$S_6$ is alternatively possible. This condition represents the safe condition of the electrical machine 4 regardless of its machine type.

The different time durations for which the machine is left in the freewheeling state in step S5 make it possible to meet different requirements of the electrical machine 4, without needing to store the machine type and/or other parameters in the controller 6. An adequate dissipation of the rotor current is made possible thanks to the lengthy waiting in the case of an electrical machine 4 designed for example as an asynchronous machine. Since such a rotor current does not occur in a permanently excited synchronous machine or the rotor current can be separately switched off in an outside excited machine, a lengthy waiting in the freewheeling state is not necessary in machines of this type, so that the switching to the active short circuiting can be substantially faster. In this way, the feeding back of electric energy to the energy accumulator 5 can be reduced to a minimum in the case of a synchronous machine or an outside excited machine.

The method makes it possible to respond to various kinds of faults in the electrical circuit arrangement 2 and/or in the motor vehicle 1 and to bring about a placing of the electrical machine 4 in a safe condition, especially in an active short circuiting of the electrical machine 4. A load shedding, for example, may be considered to be a fault of the electrical machine 4. A detected collision of the motor vehicle 1 with another object may also represent a possible fault, necessitating the fulfilling of a triggering criterion and thus a placing of the electrical machine 4 in a safe condition.

In addition to placing the electrical machine 4 in a safe condition, further safety measures can also be adopted, for example, the energy accumulator 5 can also be electrically isolated by a further switching device (not shown) from the electrical circuit 3 and/or further components of the motor vehicle 1. It is possible for the switching of the electrical machine 4 to the freewheeling and/or to the active short circuiting to occur not via an electrical circuit arrangement 3 designed as an inverter, but instead to provide a separate electrical circuit device for this in the electrical circuit arrangement 2.

German patent application no. 10 2021 129144.5, filed Nov. 9, 2021, to which this application claims priority, is hereby incorporated herein by reference in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an electrical circuit arrangement comprising an electrical circuit and an electrical machine, the method comprising:
   when at least one triggering criterion is fulfilled, switching the electrical machine via the electrical circuit to a freewheeling,
   after switching the electrical machine, determining a time duration in dependence on at least one measurement value describing a change in the stator current in the electrical machine,
   wherein a larger time duration is determined for a rather large change in stator current, associated with a configuration of the electrical machine as an asynchronous machine, than for a rather small change in the stator current, associated with a configuration of the electrical machine as a synchronous machine,
   wherein a change in stator current is considered to be a rather large change in stator current when the stator current has fallen within 100 us to at least 50% of the value of the stator current upon switching of the electrical machine to the freewheeling, and a change in stator current is considered to be a rather small change in stator current when the stator current has fallen within 100 us to at most 80% of the value of the stator current upon switching of the electrical machine to the freewheeling, and
   operating the electrical machine in the freewheeling for the determined time duration and, at the end of the determined time duration, switching the electrical machine via the electrical circuit to an active short circuiting.

2. The method according to claim 1, wherein a time duration between 100 ms and 1 s is determined for the change in stator current associated with an asynchronous machine and/or a time duration between 50 μs and 250 μs is determined for the change in stator current associated with a synchronous machine.

3. The method according to claim 1, wherein a time duration between 250 ms and 750 ms is determined for the change in stator current associated with an asynchronous machine and/or a time duration between 75 μs and 125 μs is determined for the change in stator current associated with a synchronous machine.

4. The method according to claim 1, wherein multiple measurement values of at least one stator current sensor are used as the measurement values describing the change in stator current.

5. The method according to claim 1, wherein multiple measurement values of at least one phase current sensor are used as the measurement values describing the change in stator current.

6. The method according to claim 1, wherein an inverter is used as the electrical circuit.

7. The method according to claim 1, wherein a multiphase pulse inverter is used as the electrical circuit.

8. The method according to claim 1, wherein the triggering criterion is fulfilled when a fault is present in the electrical circuit arrangement and/or in a device encompassing the electrical circuit arrangement.

9. The method according to claim 8, wherein a load shedding of the electrical machine and/or a detected collision of a device designed as a motor vehicle is used as the fault.

10. An electrical circuit comprising a controller, wherein the electrical circuit is or can be connected to an electrical machine and the controller is designed to carry out a method comprising:
    when at least one triggering criterion is fulfilled, switching the electrical machine via the electrical circuit to a freewheeling,
    after switching the electrical machine, determining a time duration in dependence on at least one measurement value describing a change in the stator current in the electrical machine,
    wherein a larger time duration is determined for a rather large change in stator current, associated with a configuration of the electrical machine as an asynchronous machine, than for a rather small change in the stator current, associated with a configuration of the electrical machine as a synchronous machine,
    wherein a change in stator current is considered to be a rather large change in stator current when the stator current has fallen within 100 μs to at least 50% of the value of the stator current upon switching of the electrical machine to the freewheeling, and a change in stator current is considered to be a rather small change in stator current when the stator current has fallen within 100 μs to at most 80% of the value of the stator current upon switching of the electrical machine to the freewheeling, and
    operating the electrical machine in the freewheeling for the determined time duration and, at the end of the determined time duration, switching the electrical machine via the electrical circuit to an active short circuiting.

11. A motor vehicle comprising an electrical circuit arrangement having an electrical machine and an electrical circuit according to claim 10 that is connected to the electrical machine.

* * * * *

UNITED STATES PATENT AND TRADEMARK OFFICE
CERTIFICATE OF CORRECTION

PATENT NO. : 12,136,895 B2  
APPLICATION NO. : 18/053729  
DATED : November 5, 2024  
INVENTOR(S) : Tobias Graßl et al.

Page 1 of 1

It is certified that error appears in the above-identified patent and that said Letters Patent is hereby corrected as shown below:

In the Claims

<u>Column 9, Claim 1, Line 19:</u>  
"100 us" should read: --100 µs--.

<u>Column 9, Claim 1, Line 24:</u>  
"100 us" should read: --100 µs--.

Signed and Sealed this  
Eighteenth Day of February, 2025

Coke Morgan Stewart  
*Acting Director of the United States Patent and Trademark Office*